Patented July 21, 1936

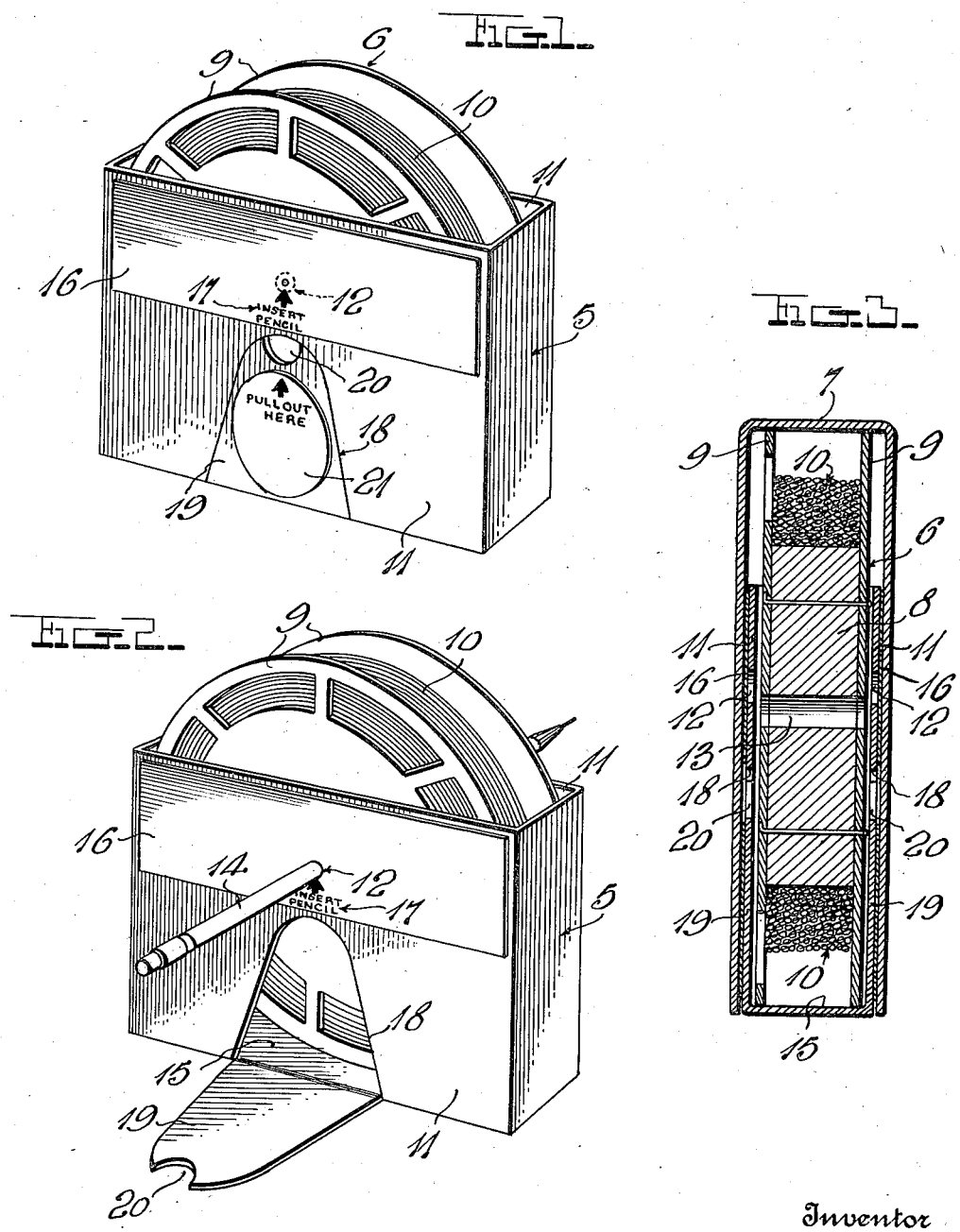

2,048,307

UNITED STATES PATENT OFFICE 2,048,307

LINE TRANSFER BOX

Oscar L. Weber, Stevens Point, Wis., assignor to Weber Lifelike Fly Co., Stevens Point, Wis., a corporation of Wisconsin Application January 24, 1935, Serial No. 3,361

7 Claims. (Cl. 242—146)

The invention relates to a unique box containing a line spool and serving to rotatably hold said spool while the line is being unwound therefrom, the device being particularly advantageous in the marketing of fishing lines (primarily fly lines) and their transfer without snarling from the spools on which they are factory wound, to the reels of fishing rods.

One object of the invention is to provide a box of the class described which may be conveniently held upon the floor by means of the user's feet while the line is being unwound therefrom.

Another object is to provide in a novel manner for the application of a foot-created drag or braking force to the line spool while the line is being unwound therefrom and wound upon a reel, thereby holding the line under such tension as to facilitate orderly winding upon the reel.

A still further object is to provide a construction in which the user may employ an ordinary pencil or the like as a shaft for rotatably supporting the line spool during unwinding of the line, making it unnecessary to factory mount the reel rotatably in the box.

Yet another aim is to provide a construction which will be exceptionally simple and inexpensive, yet efficient and desirable from numerous standpoints.

With the foregoing in view, the invention resides in the novel subject matter hereinafter described and claimed, description being accomplished by reference to the accompanying drawing.

Fig. 1 is a perspective view showing the cover of the box removed.

Fig. 2 is a view similar to Fig. 1 but showing the reel rotatably supported in the box and illustrating the latter in readiness for holding upon the floor.

Fig. 3 is a vertical transverse sectional view showing the invention as marketed.

A preferred construction has been illustrated and will be specifically described, with the understanding however that within the scope of the invention as claimed, numerous variations may be made.

The box 5 for the line spool 6, is relatively narrow and deep and is provided with a suitable removable cover 7. The spool 6 includes a suitable hub 8 and a pair of end walls 9, the line 10 being wound on said hub between said end walls. The box 5 is provided with vertical side walls 11 substantially in contact with the walls 9 of the spool 6, each of these side walls 11 being provided with a shaft-receiving opening 12 for alignment with a central opening 13 in the spool 6 when the latter is to be rotatably mounted in the box. To so mount the spool, an ordinary pencil 14 or other suitable shaft may be passed through the openings 12 and 13 as will be clear from Fig. 2. The opening 13, however, is normally considerably below the openings 12, the spool 6 then resting upon the bottom 15 of the box 5. This necessitates that the spool must be raised out of contact with the box bottom before it can be rotatably mounted upon the pencil or the like 14.

Suitable stickers or labels 16, applied to the side walls 11 of the box 5, normally extend over and close the openings 12 as seen in Figs. 1 and 3, said stickers or labels, however, being provided with suitable indicating means 17 to show the points at which they must be punctured in order that the openings 12 and 13 may receive the pencil or the like 14. The labels or stickers 16 may also be employed to carry printed directions and advertising matter.

Each side wall 11 is formed with an arched slit 18 whose ends terminate at the box bottom 15, the portions of said walls 11 within the confines of said slits, constituting foot pieces or lugs 19 which may be downwardly and outwardly folded as seen in Fig. 2. The user places the box 5 between his feet and rests one foot on each of the lugs 19 to hold said box while the line 10 is being unwound from the spool 6. The box is constructed from some flexible material, preferably cardboard, and hence its side walls 11 are flexible. The user may therefore spring these side walls inwardly with his feet without removing the latter from the lugs 19, and he may therefore frictionally engage said side walls with the walls 9 of the spool 6 to exert a drag or braking action upon said spool during unwinding of the line 10. Thus, as the line is being wound upon a reel, it may be held under such tension as to insure orderly winding without any danger of snarling.

If desired, due to the openings in the side walls 11 from which the lugs 19 are outwardly and downwardly moved, the user may engage the inner edges of his shoe soles, in the regions of the balls of the feet, directly with the walls 9 of the spool 6, to exert the required drag or the like.

The upper extremities of the lugs or foot pieces 19 are formed with notches 20 into which a finger nail may be inserted when folding said lugs or foot pieces outwardly and downwardly for use.

These members 19 preferably carry labels or stickers 21 bearing instructions as to how they are to be operatively positioned and used.

From the time of leaving the factory until the time of use, unless opened for display purposes, the box remains closed as in Fig. 3. The purchaser when desiring to unwind the line 10, removes the cover 7 and follows the printed instructions on the box, rotatably mounting the spool 6 upon a pencil or the like 14, outwardly and downwardly swinging the members 19, holding the box between his feet and holding said members 19 upon the floor, and during line winding, exerting the requisite drag upon the spool 6 by inwardly pressing the side walls 11 against the spool with his feet or by engaging the inner edges of his shoe soles directly with the reel walls 9 at the openings 18.

Excellent results are attainable from the details disclosed and they are therefore preferably followed. However, attention is again invited to the fact that numerous variations may be made within the scope of the invention as claimed.

I claim:

1. A line transfer box containing a line spool, said box having a normally upright lug at one side, said lug being hingedly mounted on a line extending along a lower corner of the box for downward folding to a horizontal position in which it may be held against the floor by one of the user's feet, whereby the box may be held while the line is being unwound from the spool.

2. A line transfer box containing a line spool, said box having a vertical side wall formed with an arched slit whose ends terminate substantially at the bottom of the box, the portion of said side wall within the confines of said arched slit being downwardly and outwardly foldable to provide a lug which may be held against the floor by one of the user's feet, whereby the box may be held while the line is being unwound from the spool.

3. A line transfer box containing a line spool, said box and spool being provided with vertical walls substantially in contact with each other, said box being constructed to be held between the user's feet and being provided at the lower end of at least one of its aforesaid vertical walls with lateral foot underlying means to be held against the floor, at least one of the aforesaid box walls having a yieldable portion positioned to be pressed inwardly against one of said walls of the spool by one of the feet holding the box, permitting the user to exert a drag on the spool while holding the box and unwinding the line therefrom.

4. A line transfer box containing a line spool, said box and spool having vertical walls substantially in contact with each other, said box being constructed for holding between the user's feet with one foot at each of the aforesaid box walls and having foot underlying means projecting laterally from the lower ends of both of its aforesaid walls to be held against the floor, said box walls being yieldable, whereby said box walls may be pressed inwardly against the spool walls by foot pressure to place a drag on the spool while holding the box and unwinding the line therefrom.

5. A line transfer box containing a line spool, said box and spool having vertical walls substantially in contact with each other, said box being constructed for holding between the user's feet with one foot at each of the aforesaid box walls and having foot underlying means projecting laterally from the lower end of at least one of said box walls to be held against the floor, at least one of said box walls having an opening exposing a lower portion of one of said spool walls, permitting the user to press with the inner edge of one of his shoe soles against said one of said spool walls to exert a drag on the spool while holding the box and unwinding the line therefrom.

6. A structure as specified in claim 3; said lateral foot-underlying means and said yieldable wall portion being relatively positioned to allow inward pressing of the latter without removing the foot from the former.

7. A structure as specified in claim 5; said laterally projecting foot-underlying means being disposed directly under said opening to allow the user to exert said drag with the shoe sole of said one foot without removing the latter from said laterally projecting foot-underlying means.

OSCAR L. WEBER.